Figure 1:
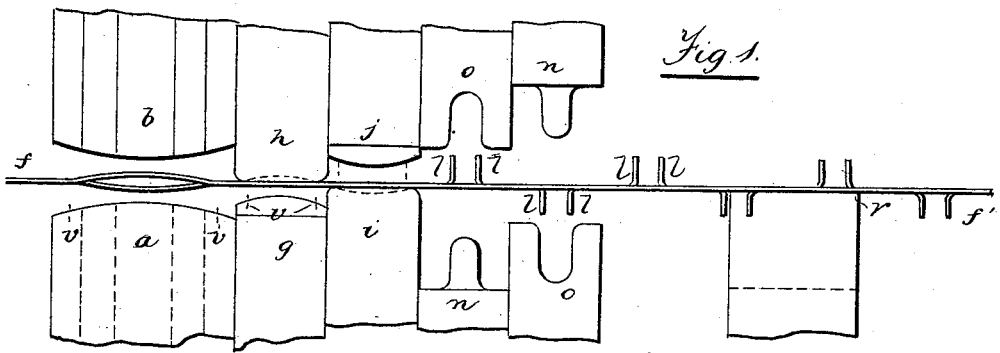

(No Model.) 2 Sheets—Sheet 1.

E. JORDAN.
DIE FOR USE IN MAKING BARBED FENCING.

No. 450,078. Patented Apr. 7, 1891.

WITNESSES:

INVENTOR
Edmund Jordan
BY
A. P. Thayer
ATTORNEY (No Model.) 2 Sheets—Sheet 2.
E. JORDAN.
DIE FOR USE IN MAKING BARBED FENCING.
No. 450,078. Patented Apr. 7, 1891.
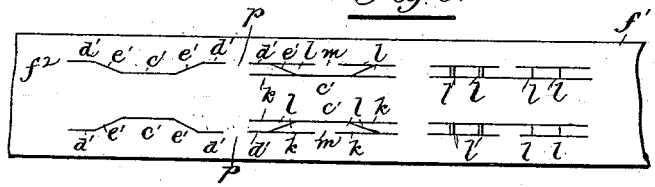
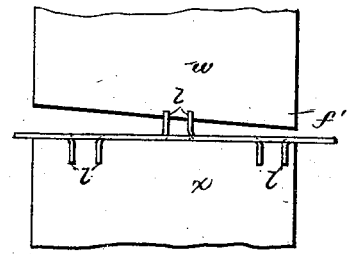
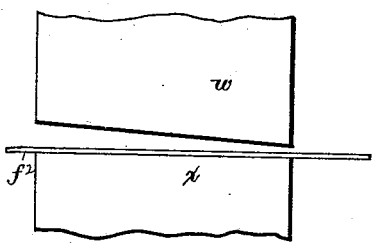
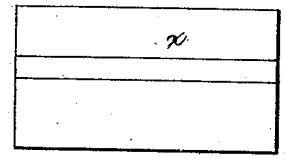
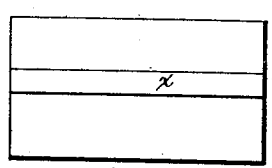
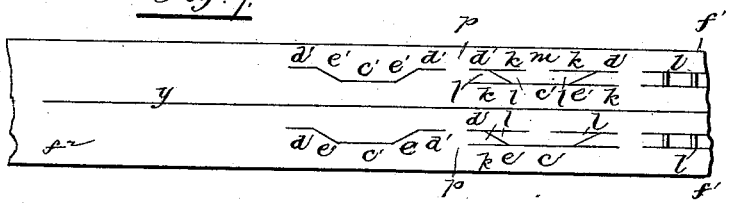
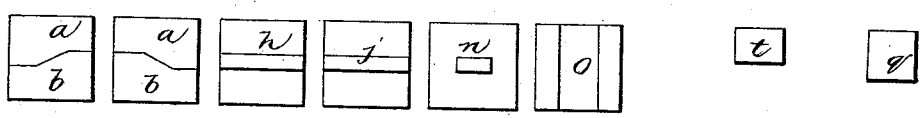
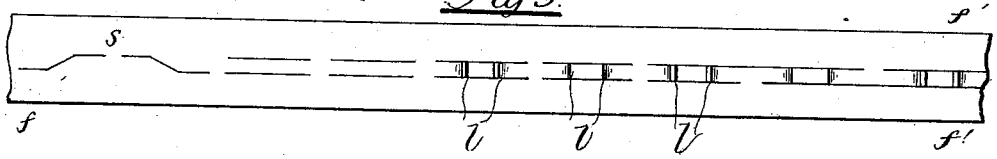
WITNESSES:
INVENTOR
Edmund Jordan
BY
A. P. Thayer
ATTORNEY

UNITED STATES PATENT OFFICE.

EDMUND JORDAN, OF BROOKLYN, ASSIGNOR, BY MESNE ASSIGNMENTS, TO THOMAS V. ALLIS, OF NEW YORK, N. Y.

DIE FOR USE IN MAKING BARBED FENCING.

SPECIFICATION forming part of Letters Patent No. 450,078, dated April 7, 1891.

Application filed July 28, 1888. Serial No. 281,311. (No model.)

*To all whom it may concern:*

Be it known that I, EDMUND JORDAN, a citizen of the United States, and a resident of Brooklyn, in the county of Kings and State of New York, have invented certain new and useful Improvements in a Combination of Dies for Use in a Machine for Making Barbed Strips, of which the following is a specification.

My invention consists of improved contrivances of dies for producing two barbed strips from one double blank strip by making slits through and at intervals along the blank in two parallel lines, and diagonal lines extending from one to the other of said parallel lines, and making other slits in line with the parallel slits, which, together with the former slits, form barbs on each strip alternately and nearly separate the barbed strips one from the other, then bending the barbs laterally to the strips for the required projection and completing the separation by cutting apart the intervals of uncut web between the slits, this being preferably the final act of the cutting, but slits for effecting this separation may be made prior to the cutting of the first-mentioned slits.

My invention also consists of duplicate contrivances of the dies for simultaneously producing four barbed strips from two double blank strips, or a quadruple blank strip by the same method of slitting the strips and forming the barbs and by separating the quadruple strip when it is used, all as hereinafter fully described, and represented in the drawings.

Figure 2:
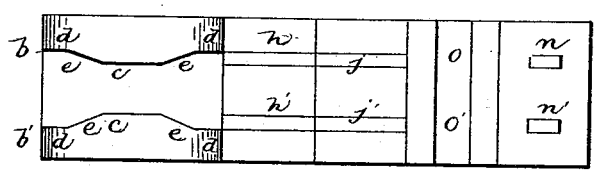
Figure 3:
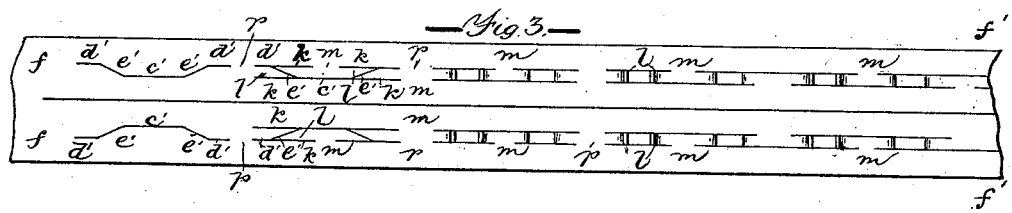
Figure 4:
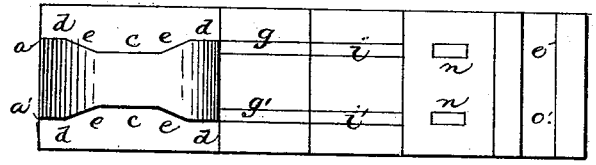
Figure 5:
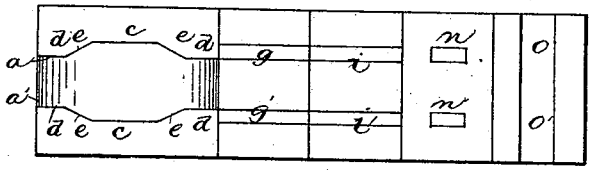
Figure 5:
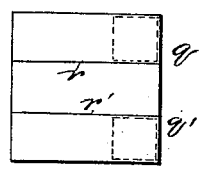

Figure 1 is a side elevation of the dies contrived according to my invention. Fig. 2 represents face views of the upper dies in the duplicate arrangement for producing four barbed strips from two double blank strips or a quadruple strip. Fig. 3 is a diagram representing two double blank strips, showing the action of the dies on it. Fig. 4 represents face views of the lower dies. Fig. 5 represents face views of the same with some modifications. Fig. 6 is a diagram of a quadruple strip representing the action of the cutting and bending dies, and a side view of slitting-dies, such as will be employed for slitting the quadruple blank subsequently to the cutting and bending of the barbs. Fig. 7 is a similar diagram and side elevation showing the slitting of the quadruple blank prior to the making of the barbs. Fig. 8 represents face views of a single range of dies for a double blank, showing a modified arrangement of the slitting-dies making the diagonal and parallel slits. Fig. 9 is a diagram of the double blank strip, showing the action of the dies of Fig. 8 on it.

I make a pair of shearing-dies $a\ b$, having the cutting-edges $c$ along the middle portion, and $d$ near each end in different parallel planes, and diagonal lines $e$ connecting the ends of said parts $c\ d$, respectively, the length of the whole of the cutting-edge being a little less than the desired distance from center to center between the pairs of barbs to be produced on the finished strips, and the distance of the planes of the edges $c\ d$ apart is that of the desired width of the barbs to be made. These dies make, preferably, the first operation in the process of producing two barbed strips from a double blank strip $f$, though the order in which they are arranged with other following-described dies may be so changed that their operation is later. They cut the slits $c'\ d'\ e'$ through the strip $f$, corresponding with the shape of the dies, as above set forth, which slits partly separate the two barbed strips $f'$, and also cut the barbs $l$ along one edge and along the points. Next following are male and female parallel edged cutting-dies $g\ h$, one being suitably grooved in the face and the other having a corresponding rib for slitting through the strip in one direction, say upward, and similar dies $i\ j$, slitting through in the opposite direction, which dies making the other slits $k$ in line with and extension of the parallel slits across the diagonal slits separate the other uncut edges of the barbs $l$ from the strip, so far as they are to be cut therefrom, but leaving the uncut webs $m$, by which the barbs remain connected with the strips, two barbs being connected by one web $m$ alternately on each strip $f'$, also leaving the webs $p$ to be subsequently separated. These two pairs of slitting-dies together make four slits $k$ to one slit $c'\ d'\ e'$, and together therewith make four barbs to each of said slits—that is, two barbs on each barb-strip—and they partly bend the barbs into the required lateral projection, which is perpendicular to the plane of the strip and alternately in opposite directions. After the operation of these second slitting-dies the strip thus completely cut for the barbs proceeds to the two pairs of bending-dies $n$ $o$, suitably placed in the train for bending two of the cut barbs one way and the other two reversely, which completes the making of the barbs, the barb-strips still remaining united by the uncut webs $p$, for cutting which the cutters $q$ $r$, preferably following the benders, are employed to separate as the final act of the process; but it is evident that these cutters may be arranged in advance of the cutters $a$ $b$, to make short slits that will have the same effect as when cut last.

To counteract any tendency of the slitted portion of the strip to spread under the action of the slitting-dies $g$ $h$ and $i$ $j$, the dies $a$ $b$ may be made with a division, as represented in Fig. 8, to leave uncut webs $s$, Fig. 9, in which case other cutters $t$ are provided to part said webs also, and preferably after the action of the benders.

It will be seen in Fig. 8 that one division of the dies $a$ $b$, together with one pair of parallel edged dies, as $g$ $h$, will, with web-cutters $q$ and $t$, produce two barbed strips from one blank by the same method of slitting as both of said divisions and the two pairs of parallel edged dies do, but will accomplish only half the amount of work in a given time, which is alike included in my invention.

The dies $a$ $b$ have convex faces, as in Fig. 1, and are to be gaged in respect of their closing, so as not to cut quite their whole length, as indicated by the dotted lines $v$, Fig. 1, and the dies $g$ $h$ and $i$ $j$ are similarly arranged both for limiting the length of the slits as desired, and also for graduating the action on the metal to prevent distortion and cracking at the end of the slits.

The slitting, bending, and the separating-dies are duplicated, as indicated at $a'$ $b'$, $g'$ $h'$, $i'j'$, $n'o'$, $q'r'$, for cutting two blank strips $f$, Fig. 3, or quadruple strips, Figs. 6 and 7, into four barbed strips at once, the duplicates being located side by side a suitable distance apart for so cutting the two double or one quadruple blank as will produce the said four barbed strips in the proper width, and when the quadruple blank strip is to be used a pair of slitting-cutters $w$ $x$ is employed to separate the quadruple blank along the line $y$, which slitting-dies may be arranged in succession of the rest, as indicated in Fig. 6, or in advance of them, as indicated in Fig. 7.

The duplicate slitting-dies $a$ $b$ and $a'$ $b'$ may be arranged with the oblique lines $e$ in the same direction, as indicated in Fig. 7, which is the preferably way because it results in a better relation of the barbed edges of the strips for splicing before twisting than otherwise; but said duplicates may be arranged with the oblique lines convergent, as in Figs. 2 and 4, or divergent, as in Fig. 5. In the latter case the uncut webs $p$ to be finally separated by the dies $q$ $r$ and $q'$ $r'$ will range with the inner lines $k$, and the dies therefor will be closer together, as in Fig. 5, wherein the dotted lines $q$ $q'$ represent two cutters and the full lines a double-edged cutter $r$ $r'$, suitably arranged for the purpose. Suitable guides as commonly used for the edges of the blanks will be employed to prevent the cut portions of the blank from spreading under the influence of the dies; but these need not be represented, as they form no part of the subjects of the claims.

The process of operation described and illustrated is reserved for a separate application for a patent.

I am aware that dies are represented in the Patent No. 311,150, and in others whose cutting-edges are formed on two parallel lines joined by oblique lines; but the parallel lines are distant from each other the length of the barbs, and the angles of the oblique lines are obtuse and cut the sides of obtuse-angled barbs, which are formed so as to project lengthwise from the strip in the form produced by the cutting and at right angles to it, while in my improved dies the lines of the parallel edges are distant from each other the width only of the body portion of the barbs, such as are cut lengthwise along the strip and are made to project by bending outward, and the angles of the oblique lines are acute and cut acute points by cutting the parallel edged barbed bars apart obliquely, and it is on these particular forms of the dies that I base my claims.

What I claim, and desire to secure by Letters Patent, is—

1. The improved shearing-dies, as $a$ $b$, having edges $c$ $d$ in parallel planes located apart from each other a distance equal to the required breadth of the barbs to be made by slitting them from the strip lengthwise of it, and also having the diagonal edges $e$, connecting said parallel edges, substantially as described.

2. The combination, with a pair of slitting-dies, as $a$ $b$, having the cutting-edges partly in two parallel lines, as $c$ $d$, and partly in a diagonal line, as $e$, connecting said parallel lines, of a pair of parallel edged slitting-dies, as $g$ $h$, arranged to make slits in extension of the parallel lines of the slits made by the first dies across the diagonal lines thereof, substantially as described.

3. The combination, with a pair of slitting-dies, as $a$ $b$, having the cutting-edges partly in two parallel lines, as $c$ $d$, and partly in a diagonal line, as $e$, connecting said parallel lines, of a pair of parallel edged slitting-dies, as $g$ $h$, arranged to make slits in extension of the parallel lines of the slits made by the first dies across the diagonal lines thereof, and web-cutting dies, as $q$ $r$, arranged to separate the uncut webs between the slits alternately in the different parallel lines of the slits, substantially as described.

4. The combination of shearing-dies, as $a\,b$, having the parallel and diagonal cutting-edges $c$, $d$, and $e$, and the parallel edged dies $g\,h$ and $i\,j$, arranged in line with said shearing-dies, substantially as described.

5. The combination of the shearing-dies, as $a\,b$, having the parallel and diagonal cutting-edges, as $c$, $d$, and $e$, parallel edged dies $g\,h$ and $i\,j$, arranged in line with said shearing-dies, and the web-cutting dies $q\,r$, also arranged in line with said shearing-dies, substantially as described.

6. The combination of the shearing-dies, as $a\,b$, having the parallel and diagonal cutting-edges, as $c$, $d$, and $e$, parallel edged dies $g\,h$ and $i\,j$, and the two pairs of bending-dies $n\,o$, arranged in line with the said shearing-dies, substantially as described.

7. The combination of the shearing-dies, as $a\,b$, having the parallel and diagonal cutting-edges, as $c$, $d$, and $e$, parallel edged dies $g\,h$ and $i\,j$, two pairs of bending-dies $n\,o$, and the web-cutters $q\,r$, arranged in line with said shearing-dies, substantially as described.

8. The combination of the duplicate shearing-dies, as $a\,b$, $a'\,b'$, having parallel and diagonal edges, as $c$, $d$, and $e$, duplicate parallel edged dies, as $g\,h$, $g'\,h'$, arranged in line with said shearing-dies, and the duplicate web-cutting dies, as $q\,r$, $q'\,r'$, also arranged in line with said shearing-dies, substantially as described.

9. The combination of duplicate shearing-dies, as $a\,b$, $a'\,b'$, having the parallel and diagonal edges, as $c$, $d$, and $e$, duplicate parallel edged cutters $g\,h$, $g'\,h'$, duplicate benders, as $o\,o'$, $n\,n'$, duplicate web-cutters $q\,r$, $q'\,r'$, and the shears $w\,x$, substantially as described.

Signed at New York city, in the county and State of New York, this 7th day of May, A. D. 1888.

EDMUND JORDAN.

Witnesses
W. J. MORGAN,
GEO. T. JANORIN.